(12) United States Patent
Terao

(10) Patent No.: US 10,734,827 B2
(45) Date of Patent: Aug. 4, 2020

(54) POWER SUPPLY SYSTEM

(71) Applicant: TOYOTA JIDOSHA KABUSHIKI KAISHA, Toyota-shi, Aichi-ken (JP)

(72) Inventor: Kenji Terao, Motosu-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 141 days.

(21) Appl. No.: 16/149,402

(22) Filed: Oct. 2, 2018

(65) Prior Publication Data
US 2019/0173291 A1    Jun. 6, 2019

(30) Foreign Application Priority Data

Dec. 6, 2017   (JP) ................................ 2017-234115

(51) Int. Cl.
*H02J 7/00* (2006.01)
*B60R 16/033* (2006.01)
*H02J 7/34* (2006.01)

(52) U.S. Cl.
CPC ............ *H02J 7/007* (2013.01); *B60R 16/033* (2013.01); *H02J 7/0031* (2013.01); *H02J 7/0068* (2013.01); *H02J 7/342* (2020.01)

(58) Field of Classification Search
CPC .......... H02J 7/007; H02J 7/342; H02J 7/0031; H02J 7/0068; H02J 2310/46; B60R 16/033
See application file for complete search history.

(56) References Cited

U.S. PATENT DOCUMENTS

| 2003/0029654 A1* | 2/2003 | Shimane | B60K 6/28 180/65.29 |
| 2003/0117019 A1* | 6/2003 | Furukawa | B60L 1/02 307/10.6 |
| 2007/0116135 A1* | 5/2007 | Tsuchida | B62D 5/046 375/259 |
| 2010/0006360 A1* | 1/2010 | Kishimoto | B60L 50/16 180/65.285 |
| 2012/0223575 A1 | 9/2012 | Hachiya et al. | |

FOREIGN PATENT DOCUMENTS

| JP | 2012-060819 A | 3/2012 |
| JP | 2012-182894 A | 9/2012 |

* cited by examiner

*Primary Examiner* — Rexford N Barnie
*Assistant Examiner* — Thai H Tran
(74) *Attorney, Agent, or Firm* — Oliff PLC

(57) ABSTRACT

A power supply system includes a DC-DC converter, a relay, and a control unit configured to i) start up the DC-DC converter based on a state transition of an ignition signal from OFF to ON, ii) cause the DC-DC converter to output a first low voltage when a high-voltage battery is connected to the DC-DC converter by the relay, iii) cause the DC-DC converter to output a voltage specified by an output voltage command in a case where the output voltage command is provided from a high-order ECU after output of the first low voltage is started, and iv) cause the DC-DC converter to output a fixed voltage higher than the first low voltage in a case where the output voltage command is not provided from the high-order ECU by a time at which a first time elapses after the output of the first low voltage is started.

5 Claims, 2 Drawing Sheets

POWER SUPPLY SYSTEM

INCORPORATION BY REFERENCE

The disclosure of Japanese Patent Application No. 2017-234115 filed on Dec. 6, 2017 including the specification, drawings and abstract is incorporated herein by reference in its entirety.

BACKGROUND

1. Technical Field

The disclosure relates to a power supply system that is provided in a vehicle.

2. Description of Related Art

A power supply system is disclosed in, for example, each of Japanese Patent Application Publication No. 2012-060819 (JP 2012-060819 A) and Japanese Patent Application Publication No. 2012-182894 (2012-182894 A). In the power supply system, a DC-DC converter supplies power from a high-voltage battery to a low-voltage battery and a low-voltage load on the basis of an output voltage command provided by a high-order ECU.

SUMMARY

In the power supply system described in each of the above patent documents, in the case where the output voltage command is no longer provided to the DC-DC converter due to failure of the high-order ECU or breakage of a line through which the high-order ECU sends the output voltage command to the DC-DC converter, the DC-DC converter is stopped, and the power is no longer supplied to the low-voltage battery and the low-voltage load. As a result, the low-voltage battery eventually runs out, and accordingly, the low-voltage load may not normally operate.

The disclosure provides a power supply system in which a DC-DC converter can be operated with a specified output voltage even when an output voltage command is not provided from a high-order ECU to the DC-DC converter.

An aspect of the disclosure relates to a power supply system configured to supply electric power from a high-voltage battery to a low-voltage battery and a low-voltage load based on a command from a high-order electronic control unit. The power supply system includes a direct current-direct current converter configured to convert a voltage of the high-voltage battery to a specified voltage and to output the specified voltage to the low-voltage battery and the low-voltage load; a relay configured to change a connection state between the high-voltage battery and the direct current-direct current converter; and a control unit provided in the direct current-direct current converter and configured to control an output voltage of the direct current-direct current converter based on a state of an ignition signal and the command from the high-order electronic control unit. The control unit is configured to i) start up the direct current-direct current converter based on a state transition of the ignition signal from an off state to an on state, ii) cause the direct current-direct current converter to output a specified first low voltage when the high-voltage battery is connected to the direct current-direct current converter by the relay after the direct current-direct current converter is started up, iii) cause the direct current-direct current converter to output a voltage specified by an output voltage command in a case where the output voltage command is provided from the high-order electronic control unit after output of the specified first low voltage is started, and iv) cause the direct current-direct current converter to output a specified fixed voltage that is higher than the specified first low voltage in a case where the output voltage command is not provided from the high-order electronic control unit by a time at which a specified first time elapses after the output of the specified first low voltage is started.

In this control, start-up of the DC-DC converter is triggered by the state transition of the ignition (IG) signal from the off state to the on state (i.e., from OFF to ON). The high-voltage battery and the direct current-direct current-converter (DC-DC converter) are connected by the relay after the start-up of the DC-DC converter. In the case where the output voltage command is not provided from the high-order electronic control unit (ECU) by the time at which the first time elapses after the high-voltage battery and the DC-DC converter are connected, the fixed voltage is output from the DC-DC converter.

Thus, even when the output voltage command is not provided from the high-order ECU, the DC-DC converter can autonomously output the fixed voltage after the first time elapses, on the basis of the IG signal. Thus, the DC-DC converter can charge the low-voltage battery with the use of the fixed voltage and can supply electric power based on the fixed voltage to the low-voltage load.

In the power supply system according to the above aspect, the control unit may be configured to cause the direct current-direct current converter to output a specified second low voltage that is lower than the specified fixed voltage based on the state transition of the ignition signal from the on state to the off state, and cause the direct current-direct current converter to stop outputting the specified second low voltage in a case where the output voltage command is no longer provided from the high-order electronic control unit or a specified second time elapses after output of the specified second low voltage is started.

In the control, in the case where the output voltage command is not provided from the high-order ECU by the time at which the second time elapses after the state transition of the IG signal from ON to OFF, the DC-DC converter stops outputting the second low voltage. Accordingly, even in the case where the output voltage command is not provided from the high-order ECU after the autonomous output of the fixed voltage, the DC-DC converter can autonomously stop outputting the voltage after the second time elapses, on the basis of the IG signal. Thus, it is possible to avoid a situation where the DC-DC converter continues to be operated unnecessarily and electric power is consumed wastefully.

In the power supply system according to the above aspect, the control unit may be configured to cause the direct current-direct current converter to stop outputting the specified second low voltage before the high-voltage battery and the direct current-direct current converter are disconnected by the relay.

Thus, since the relay is turned off in the state where the current flowing through the relay is zero, it is possible to prevent a situation where a contact point of the relay is stuck.

In the power supply system according to the above aspect, each of the specified first low voltage and the specified second low voltage may be set to a voltage which is substantially same as a voltage of the low-voltage battery and at which a current flowing through the relay is substantially zero.

Thus, since the relay is turned on in the state where the current flowing through the relay is substantially zero, it is possible to prevent a situation where the contact point of the relay is stuck. In addition, since the current flowing through the relay is substantially zero, even if the relay is turned off in the state where the second low voltage is output from the DC-DC converter, it is possible to prevent the situation where the contact point of the relay is stuck.

In the power supply system according to the above aspect, the specified fixed voltage may be set to a minimum voltage at which the low-voltage battery is able to be charged. Thus, even when the output voltage command is not provided from the high-order ECU, it is possible to charge the low-voltage battery.

In the power supply system according to the above aspect of the disclosure, even when the output voltage command is not provided from the high-order ECU to the DC-DC converter, the DC-DC converter can be operated with the specified output voltage.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A power supply system according to an embodiment is configured to supply electric power from a high-voltage battery to a low-voltage battery and a low-voltage load on the basis of a command from a high-order electronic control unit (ECU). In the power supply system, start-up of a direct current-direct current converter (DC-DC converter) is triggered by a state transition of an ignition (IG) signal from an off state to an on state (i.e., from OFF to ON). In other words, DC-DC converter is started up based on the state transition of the IG signal from OFF to ON (i.e., the DC-DC converter is started up when the IG signal changes from OFF to ON). Then, a low voltage is output from the DC-DC converter after the start-up of the DC-DC converter. In the case where an output voltage command is not provided from the high-order ECU by a time at which a specified time elapses after the output of the low voltage is started, a fixed voltage is output from the DC-DC converter. Thus, even when the output voltage command is not provided from the high-order ECU due to failure of the high-order ECU or the like, the DC-DC converter can autonomously output the fixed voltage on the basis of the IG signal. Thus, the DC-DC converter can be operated with a specified output voltage.

Figure 1:
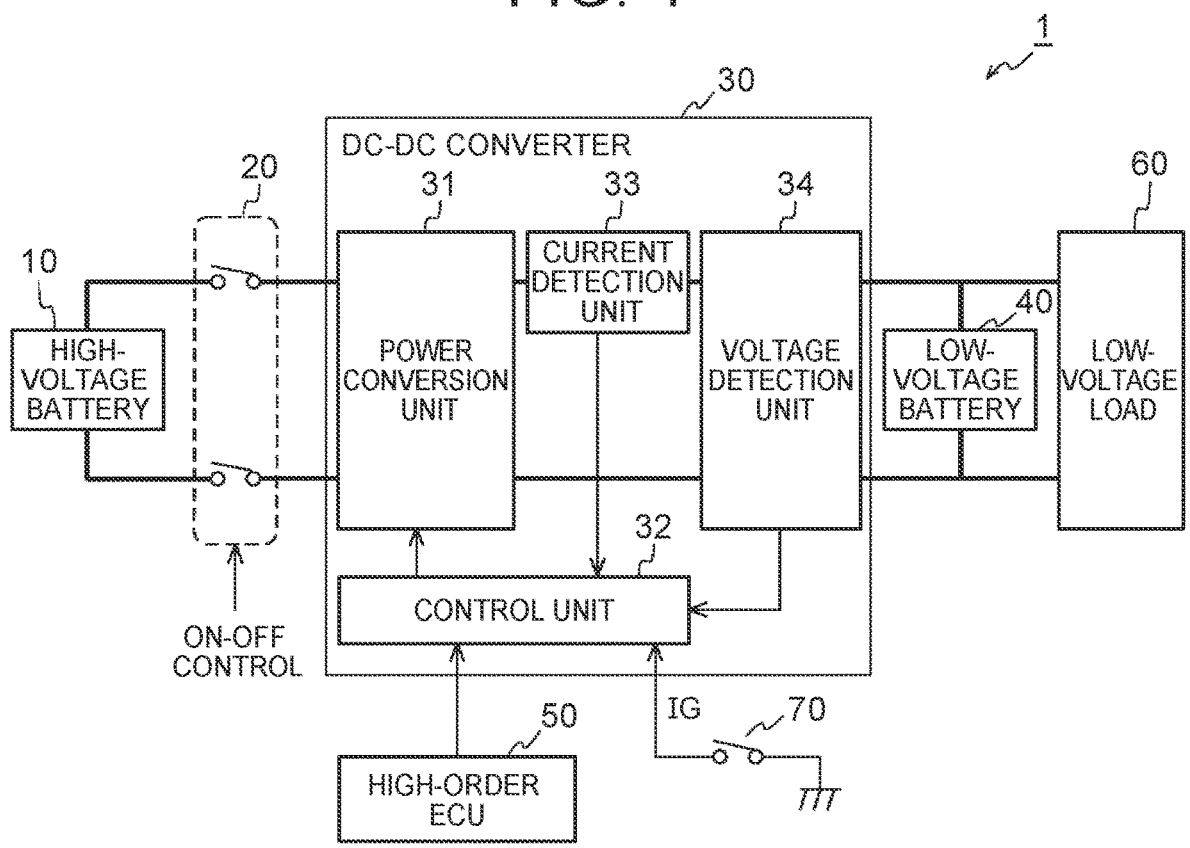
FIG. 1 is a diagram showing a configuration example of a power supply system according to an embodiment of the disclosure.

FIG. 1 is a diagram showing a configuration example of a power supply system 1 according to the embodiment of the disclosure. The power supply system 1 of the embodiment shown in FIG. 1 includes a high-voltage battery 10, a high-voltage cutout relay 20, a DC-DC converter 30, a low-voltage battery 40, and a high-order ECU 50. Note that, in FIG. 1, lines through which an electric power signal flows are indicated by bold lines and lines through which a control signal and the like flow are indicated by thin arrowed lines.

The high-voltage battery 10 is an electric power storage element configured to be rechargeable (chargeable and dischargeable), such as a lithium battery. The high-voltage battery 10 is connected to the DC-DC converter 30 via the high-voltage cutout relay 20.

The high-voltage cutout relay 20 is inserted between the high-voltage battery 10 and the DC-DC converter 30 and is configured to execute ON-OFF control for changing a connection state between the high-voltage battery 10 and the DC-DC converter 30 on the basis of control executed by an electronic control unit (ECU), which is not shown. In the high-voltage cutout relay 20 shown in FIG. 1, a relay is provided on each of a positive electrode side and a negative electrode side. However, the relay may be provided on only one of the electrode sides.

The DC-DC converter 30 is configured to convert a voltage of the high-voltage battery 10 to a specified voltage and output the specified voltage to the low-voltage battery 40 and a low-voltage load 60. The DC-DC converter 30 includes a power conversion unit 31, a control unit 32, a current detection unit 33, and a voltage detection unit 34.

The power conversion unit 31 can receive electric power (the voltage, a current) from the high-voltage battery 10 and can output the electric power (the voltage, the current) used to charge the low-voltage battery 40 and/or supplied to the low-voltage load 60, to the low-voltage battery 40 and the low-voltage load 60 in accordance with control executed by the control unit 32.

The current detection unit 33 is, for example, a current sensor, and is provided to detect the current (an output current) flowing from the DC-DC converter 30 (the power conversion unit 31) into the low-voltage battery 40 and the low-voltage load 60. A current value detected by the current detection unit 33 is output to the control unit 32.

The voltage detection unit 34 is, for example, a voltage sensor, and is provided to detect a voltage (an output voltage) that appears between positive and negative output terminals of the DC-DC converter 30 (the power conversion unit 31). A voltage value detected by the voltage detection unit 34 is output to the control unit 32.

The control unit 32 acquires the output voltage command from the high-order ECU 50, the IG signal from an IG switch 70, the current value from the current detection unit 33, and the voltage value from the voltage detection unit 34. Then, the control unit 32 optimally controls an operation state of the DC-DC converter 30 (the power conversion unit 31) and the output voltage on the basis of the output voltage command from the high-order ECU 50, a state of the IG signal, the current value, and the voltage value.

Note that the above-described DC-DC converter 30 is entirely or partially configured as an electronic control unit (ECU) that typically includes a central processing unit (CPU), memory, and an input-output interface. In the electronic control unit, the above-described specified functions are realized when a program stored in the memory is read and executed by the CPU.

The low-voltage battery 40 is a power storage element configured to be rechargeable (chargeable and dischargeable), such as a lead battery. The low-voltage battery 40 is connected to the DC-DC converter 30 so as to be chargeable with the use of the electric power output from the DC-DC converter 30. The low-voltage battery 40 is also connected to the low-voltage load 60 and supplies required electric power to the low-voltage load 60. A voltage of the low-voltage battery 40 is set to be lower than the voltage of the high-voltage battery 10.

The high-order ECU 50 is an electronic control unit (ECU) that executes higher layer control as compared to the control unit 32 of the DC-DC converter 30. The high-order ECU 50 provides the output voltage command to the control unit 32 of the DC-DC converter 30 to specify (i.e., indicate) the voltage to be output from the DC-DC converter 30. The output voltage command may be, for example, a duty ratio (i.e., a duty cycle) of a Pulse Width Modulation (PWM) signal that determines a switching operation of the power conversion unit 31 in the DC-DC converter 30. In addition, the high-order ECU 50 monitors the ECU (not shown) that executes the ON-OFF control of the high-voltage cutout relay 20 and thus can acquire the connection state of the high-voltage cutout relay 20.

Examples of the low-voltage load 60 include an electric power steering device, an electric brake system, an audio system, a wiper device, a power window device, and a lighting device.

Figure 2:
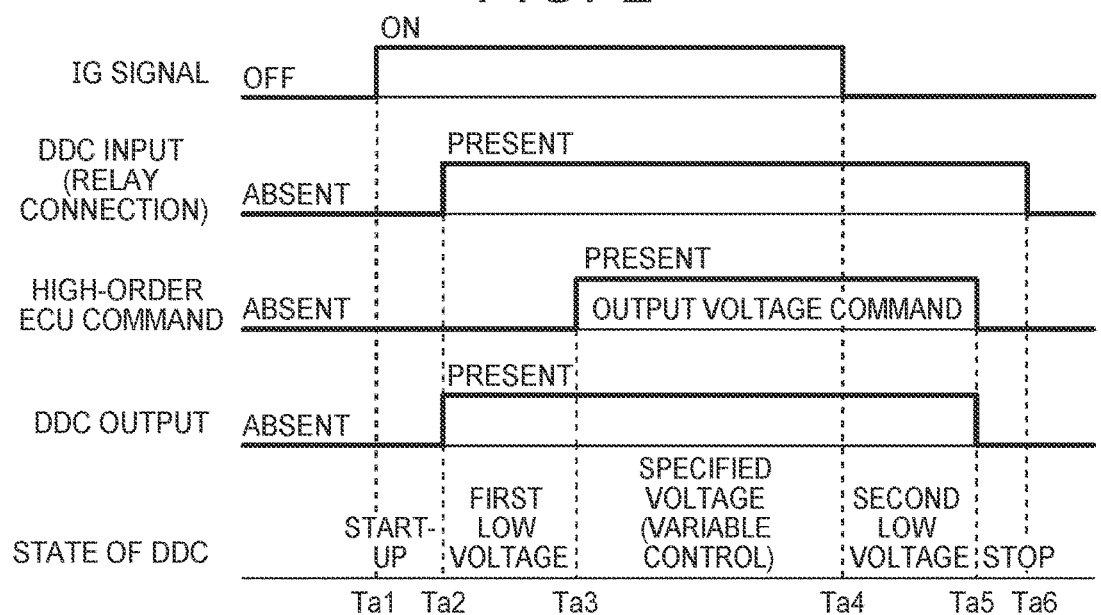
FIG. 2 is a timing chart in the case of a normal operation in which a high-order ECU provides a DC-DC converter with an output voltage command.
Figure 3:
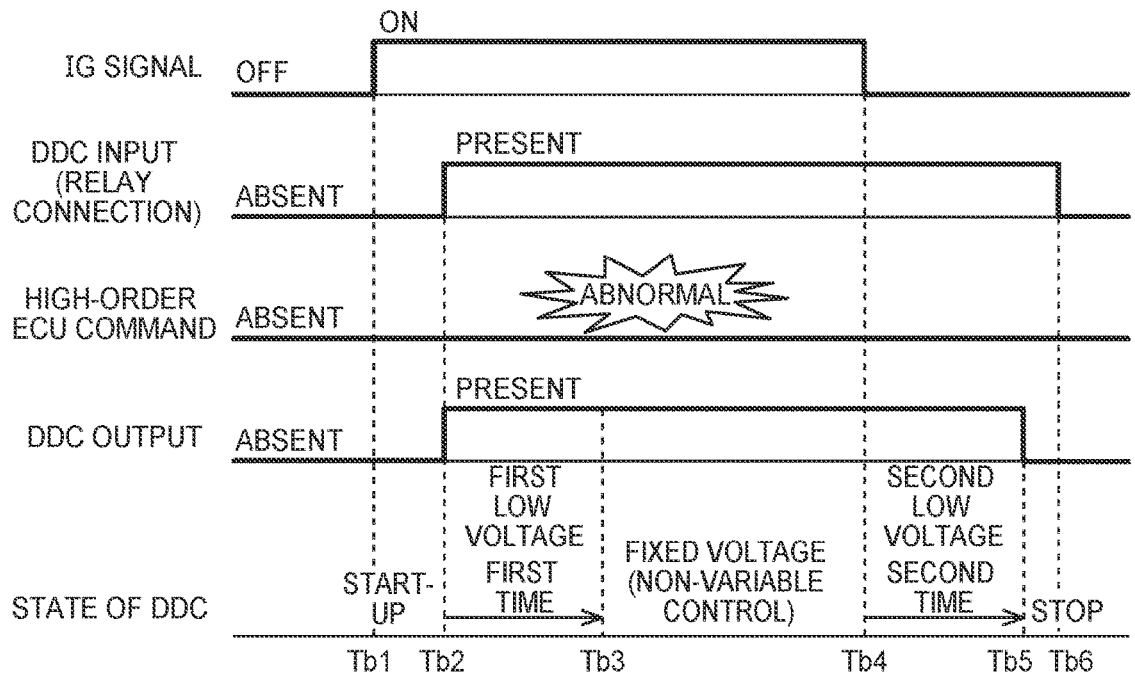
FIG. 3 is a timing chart in the case of an abnormal operation in which the high-order ECU does not provide the DC-DC converter with the output voltage command.

Next, a description will be provided on the control executed by the power supply system 1 according to the embodiment of the disclosure with further reference to FIG. 2 and FIG. 3. FIG. 2 is a timing chart in the case of a normal operation in which the high-order ECU 50 provides the control unit 32 of the DC-DC converter (DDC) 30 with the output voltage command. FIG. 3 is a timing chart in the case of an abnormal operation in which the high-order ECU 50 does not provide the control unit 32 of the DC-DC converter (DDC) 30 with the output voltage command.

First, a description will be provided on processing that is executed at each of timing Ta1 to timing Ta6 in the normal operation shown in FIG. 2.

At the timing Ta1, a user or the like operates the IG switch 70 to cause the state transition of the IG signal from OFF to ON. On the basis of the state transition of the IG signal, the DC-DC converter 30 is started up and brought into a standby state. Thus, the DC-DC converter 30 is brought into a state where the DC-DC converter 30 can supply the electric power to the low-voltage battery 40 and the low-voltage load 60 at any time.

At the timing Ta2, the high-voltage battery 10 is connected to the DC-DC converter 30 by the high-voltage cutout relay 20, and the high-voltage of the high-voltage battery 10 is applied to an input side of the DC-DC converter 30. In response to the voltage application, the DC-DC converter 30 performs an autonomous operation to output a specified first low voltage at which the current flowing through the high-voltage cutout relay 20 is substantially zero, to an output side.

The first low voltage is determined by executing predetermined adjustment processing in the vehicle, or the like. For example, the first low voltage may be set to a voltage at which charging of the low-voltage battery 40 can be promptly started in accordance with the output voltage command from the high-order ECU 50 in the case where a state of charge (SOC) of the low-voltage battery 40 is low and electric discharge from the low-voltage battery 40 is not allowed. More specifically, the first low voltage may be set to a minimum voltage (for example, 12.5 V to 12.9 V) that can prevent the low-voltage battery 40 from running out. Note that, in the case where the state of charge (SOC) of the low-voltage battery 40 is high and the electric discharge thereof is allowed or an influence of the electric discharge is insignificant, the DC-DC converter 30 may not perform the autonomous operation for outputting the first low voltage (i.e., the DC-DC converter 30 may not output the first low voltage).

After output of the first low voltage is started, the DC-DC converter 30 receives the output voltage command from the high-order ECU 50 at the timing Ta3. Thus, the DC-DC converter 30 executes normal variable control and outputs the voltage specified by the output voltage command, to the output side.

At the timing Ta4, the user or the like operates the IG switch 70 to cause the state transition of the IG signal from ON to OFF. On the basis of the state transition of the IG signal, the DC-DC converter 30 performs an autonomous operation to restrict the voltage that is output to the output side, to a specified second low voltage at which the current flowing through the high-voltage cutout relay 20 is substantially zero. Provision of the output voltage command from the high-order ECU 50 is not immediately stopped even after the state transition of the IG signal from ON to OFF occurs, because electric power should be supplied to the ECU and an actuator that are operated even when the IG signal is OFF, and it is necessary to avoid a situation where the DC-DC converter 30 that has been operated with a high voltage is suddenly stopped.

As is the case with the above-described first low voltage, the second low voltage is determined by executing the predetermined adjustment processing in the vehicle, or the like. The second low voltage may be the same as the first low voltage or may be different from the first low voltage.

After output of the second low voltage is started, the DC-DC converter 30 stops outputting the second low voltage in response to stopping of the provision of the output voltage command from the high-order ECU 50 at the timing Ta5. The phrase "stopping of the provision of the output voltage command from the high-order ECU 50" signifies a concept that includes "the stopping of the provision of the output voltage command that has been continuously provided so far", "provision of an output voltage command specifying the voltage of 0 (zero) V", and "provision of an output stop command for stopping the output of the DC-DC converter 30".

At the timing Ta6, the high-voltage battery 10 and the DC-DC converter 30 are disconnected by the high-voltage cutout relay 20, and the high-voltage of the high-voltage battery 10 that is applied to the input side of the DC-DC converter 30 is blocked.

Next, a description will be provided on processing that is executed at each of timing Tb1 to timing Tb6 in the abnormal operation shown in FIG. 3.

At the timing Tb1, the user or the like operates the IG switch 70 to cause the state transition of the IG signal from OFF to ON. On the basis of the state transition of the IG signal, the DC-DC converter 30 is started up and brought into the standby state. Thus, the DC-DC converter 30 is brought into the state where the DC-DC converter 30 can supply electric power to the low-voltage battery 40 and the low-voltage load 60 at any time.

At the timing Tb2, the high-voltage battery 10 is connected to the DC-DC converter 30 by the high-voltage cutout relay 20, and the high-voltage of the high-voltage battery 10 is applied to the input side of the DC-DC converter 30. In response to the voltage application, the DC-DC converter 30 performs an autonomous operation to output the specified first low voltage at which the current flowing through the high-voltage cutout relay 20 is substantially zero, to an output side. The first low voltage is as described above.

In the case where the output voltage command is not provided from the high-order ECU 50 by the time at which a specified first time elapses after the output of the first low voltage is started (i.e., in the case where the output voltage command is not provided in a period from the time at which the output of the first low voltage is started to the time at which the specified first time elapses), the DC-DC converter 30 performs an autonomous operation to output a specified fixed voltage to the output side at the timing Tb3. The first time is set to be longer than a time from the start of the output of the first low voltage to timing (the above timing Ta3) at which the output voltage command is provided from the high-order ECU 50 in the normal operation, and shorter than a specified time from the start of the output of the first low voltage until it becomes necessary to supply a sufficient amount of electric power to the low-voltage load 60. For example, the first time may be set to 10 seconds. The fixed voltage is determined by executing the predetermined adjustment processing in the vehicle, or the like. For example, the fixed voltage may be the voltage (for example, 13.5 V) which is higher than the first low voltage and which is the minimum voltage at which the low-voltage battery 40 can be charged.

At the timing Tb4, the user or the like operates the IG switch 70 to cause the state transition of the IG signal from ON to OFF. On the basis of the state transition of the IG signal, the DC-DC converter 30 performs an autonomous operation to restrict the voltage that is output to the output side, to the specified second low voltage at which the current flowing through the high-voltage cutout relay 20 is substantially zero. The DC-DC converter 30 is not immediately stopped even after the state transition of the IG signal from ON to OFF occurs, because, for example, it is necessary to avoid a situation where the DC-DC converter 30 that has been operated with a high voltage is suddenly stopped. The second low voltage is as described above.

In the case where the output voltage command specifying (i.e., indicating) the voltage of 0 V or the output stop command for stopping the output of the DC-DC converter 30 is not provided from the high-order ECU 50 by the time at which a specified second time elapses after the output of the second low voltage is started, the DC-DC converter 30 performs an autonomous operation to stop outputting the second low voltage at the timing Tb5. The second time is set to be longer than a time from the state transition of the IG signal from ON to OFF to the stopping of the provision of the output voltage command from the high-order ECU 50 (the above timing Ta5) in the normal operation and shorter than a specified time from the state transition of the IG signal from ON to OFF until the high-voltage battery 10 and the DC-DC converter 30 are disconnected by the high-voltage cutout relay 20. For example, the second time may be set to 20 seconds.

At the timing Tb6, the high-voltage battery 10 and the DC-DC converter 30 are disconnected by the high-voltage cutout relay 20, and the high-voltage of the high-voltage battery 10 that is applied to the input side of the DC-DC converter 30 is blocked.

In the above-described power supply system 1 according to the embodiment of the disclosure, the start-up of the DC-DC converter 30 is triggered by the state transition of the IG signal from OFF to ON. After the start-up of the DC-DC converter 30, the high-voltage battery 10 and the DC-DC converter 30 are connected by the high-voltage cutout relay 20. In the case where the output voltage command is not provided from the high-order ECU 50 by the time at which the first time elapses after the high-voltage battery 10 and the DC-DC converter 30 are connected, the fixed voltage is output from the DC-DC converter 30.

Thus, even when the output voltage command is not provided from the high-order ECU 50, the DC-DC converter 30 can autonomously output the fixed voltage after the first time elapses, on the basis of the IG signal. Thus, the DC-DC converter 30 can charge the low-voltage battery 40 using the fixed voltage and can supply electric power based on the fixed voltage to the low-voltage load 60.

In addition, in the power supply system 1 according to the embodiment, the control unit 32 causes the DC-DC converter 30 to output the second low voltage that is lower than the fixed voltage, on the basis of the state transition of the IG signal from ON to OFF. Then, in the case where the output voltage command is no longer provided from the high-order ECU 50 or the second time elapses after the output of the second low voltage is started, the DC-DC converter 30 stops outputting the second low voltage.

Thus, in the case where the output voltage command is not provided from the high-order ECU 50 by the time at which the second time elapses after the state transition of the IG signal from ON to OFF (i.e., in the case where the output voltage command is not provided from the high-order ECU 50 in a period from the state transition of the IG signal from ON to OFF to the time at which the second time elapses), the DC-DC converter 30 can stop outputting the voltage. Accordingly, even in the case where the output voltage command is not provided from the high-order ECU 50 after the autonomous output of the fixed voltage, the DC-DC converter 30 can autonomously stop outputting the voltage after the second time elapses, on the basis of the IG signal. Thus, it is possible to avoid a situation where the DC-DC converter 30 continues to be operated unnecessarily and the power is consumed wastefully.

An application example (i.e., a modified example) will be described. In the power supply system 1 according to the embodiment, the output voltage command from the high-order ECU 50 is sent and received with the use of a dedicated line (a direct line) that connects the high-order ECU 50 and the control unit 32 of the DC-DC converter 30, and the IG signal based on the IG switch 70 is sent and received with the use of a dedicated line (a direct line) that connects the IG switch 70 and the control unit 32 of the DC-DC converter 30.

Figure 4:
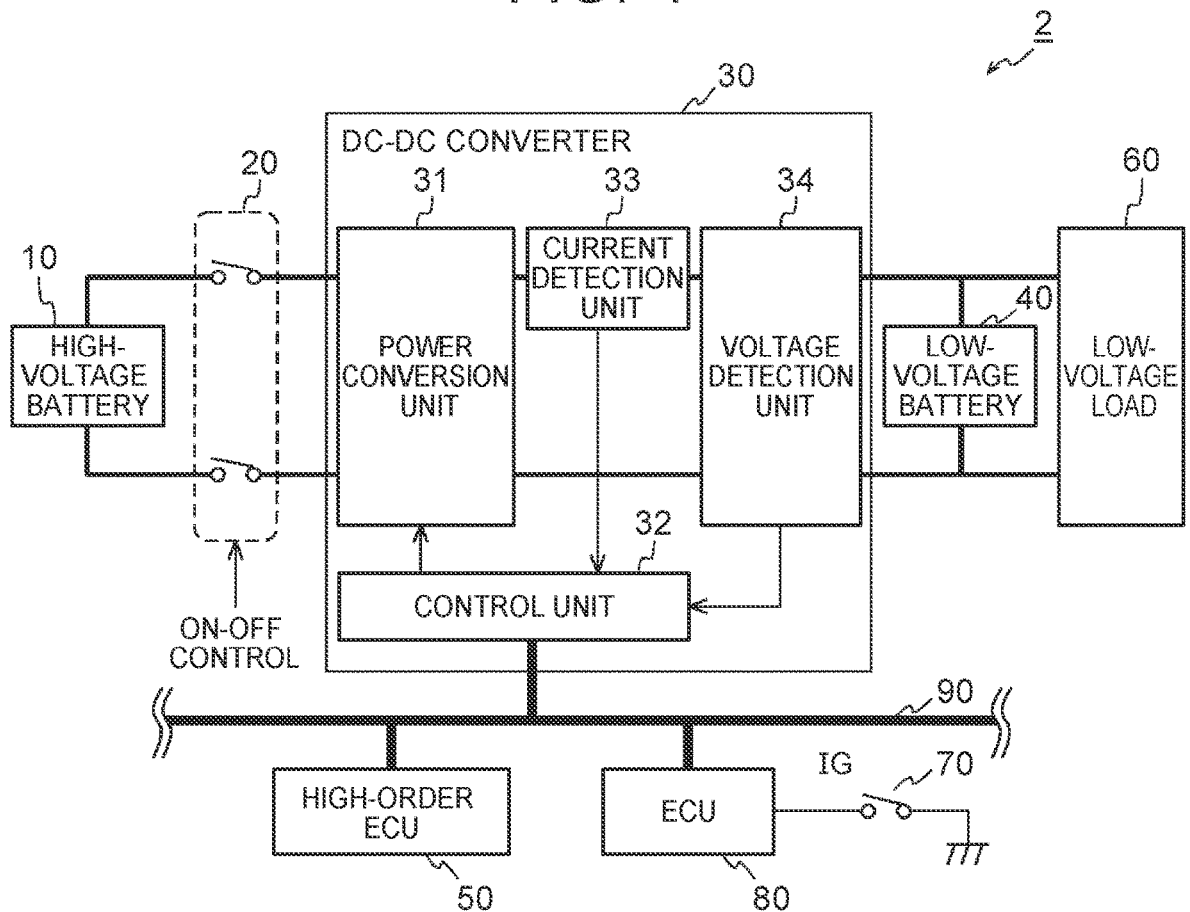
FIG. 4 is a diagram showing a configuration example of a power supply system according to an application example of the embodiment of the disclosure.

However, as in a power supply system 2 shown in FIG. 4, in a configuration in which the high-order ECU 50, the DC-DC converter 30, and an ECU 80 controlling the IG switch 70 are connected by an in-vehicle network such as a CAN bus 90, one of, or both of the output voltage command and the IG signal may be sent and received through a controller area network (CAN) communication. In this case, the DC-DC converter 30 needs to be configured such that the DC-DC converter 30 can be started up in response to the reception of a CAN signal.

The power supply system of the disclosure can be used, for example, in a vehicle in which electric power is supplied from a high-voltage battery to a low-voltage battery and a low-voltage load.

What is claimed is:
1. A power supply system configured to supply electric power from a high-voltage battery to a low-voltage battery and a low-voltage load based on a command from a high-order electronic control unit, the power supply system comprising:

a direct current-direct current converter configured to convert a voltage of the high-voltage battery to a plurality of specified voltages and to output the specified voltage to the low-voltage battery and the low-voltage load;

a relay configured to change a connection state between the high-voltage battery and the direct current-direct current converter (DC/DC converter); and a control unit provided in the DC/DC converter and configured to control an output voltage, which is one of the specified voltages of the DC/DC converter, based on a state of an ignition signal and the command from the high-order electronic control unit, wherein the control unit is configured to:
i) start up the DC/DC converter based on a state transition of the ignition signal from an off state to an on state,
ii) cause the DC/DC converter to output a specified first low voltage when the high-voltage battery is connected to the DC/DC converter by the relay after the DC/DC converter is started up,
iii) cause the DC/DC converter to output a voltage specified by an output voltage command in a case where the output voltage command is provided from the high-order electronic control unit after output of the specified first low voltage is started, and
iv) cause the DC/DC converter to output a specified fixed voltage that is higher than the specified first low voltage in a case where the output voltage command is not provided from the high-order electronic control unit by a time at which a specified first time elapses after the output of the specified first low voltage is started.

2. The power supply system according to claim 1, wherein:
the control unit is configured to cause the DC/DC converter to output a specified second low voltage that is lower than the specified fixed voltage based on the state transition of the ignition signal from the on state to the off state, and
cause the DC/DC converter to stop outputting the specified second low voltage in a case where the output voltage command is no longer provided from the high-order electronic control unit or a specified second time elapses after output of the specified second low voltage is started.

3. The power supply system according to claim 2, wherein the control unit is configured to cause the DC/DC converter to stop outputting the specified second low voltage before the high-voltage battery and the DC/DC converter are disconnected by the relay.

4. The power supply system according to claim 2, wherein each of the specified first low voltage and the specified second low voltage is set to a voltage which is substantially same as a voltage of the low-voltage battery and at which a current flowing through the relay is substantially zero.

5. The power supply system according to claim 1, wherein the specified fixed voltage is set to a minimum voltage at which the low-voltage battery is able to be charged.

* * * * *